United States Patent
Vervoordeldonk et al.

(10) Patent No.: US 8,091,694 B2
(45) Date of Patent: Jan. 10, 2012

(54) ACTUATOR ARRANGEMENT FOR ACTIVE VIBRATION ISOLATION COMPRISING AN INERTIAL REFERENCE MASS

(75) Inventors: Michael Johannes Vervoordeldonk, Eindhoven (NL); Theo Anjes Maria Ruijl, Eindhoven (NL); Robertus Mathijs Gerardus Rijs, Eindhoven (NL); Johannes Cornelius Antonius Muller, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 775 days.

(21) Appl. No.: 10/570,291

(22) PCT Filed: Aug. 17, 2004

(86) PCT No.: PCT/IB2004/051472
§ 371 (c)(1),
(2), (4) Date: Feb. 28, 2006

(87) PCT Pub. No.: WO2005/024266
PCT Pub. Date: Mar. 17, 2005

(65) Prior Publication Data
US 2007/0035074 A1  Feb. 15, 2007

(30) Foreign Application Priority Data

Sep. 5, 2003 (EP) ................................. 03103305
Apr. 19, 2004 (EP) ................................. 04101604

(51) Int. Cl.
*F16F 7/10* (2006.01)
*F16M 13/00* (2006.01)

(52) U.S. Cl. ............... 188/378; 188/380; 267/140.14; 267/140.15

(58) Field of Classification Search .............. 188/378, 188/379, 380; 267/64.11, 64.28, 140.14, 267/140.15, 136; 248/562, 636, 638
See application file for complete search history.

(56) References Cited

U.S. PATENT DOCUMENTS

| | | | | |
|---|---|---|---|---|
| 3,445,080 A | * | 5/1969 | Flannelly | 248/564 |
| 4,335,611 A | * | 6/1982 | Bennett et al. | 73/514.19 |
| 4,360,087 A | * | 11/1982 | Curwen | 188/379 |
| 4,821,205 A | * | 4/1989 | Schutten et al. | 700/280 |
| 5,020,781 A | * | 6/1991 | Huang | 267/136 |
| 5,265,704 A | * | 11/1993 | Landesfeind | 188/378 |

(Continued)

FOREIGN PATENT DOCUMENTS

JP          550829 A   *  3/1993

(Continued)

OTHER PUBLICATIONS

Peter G. Nelson: An Active Vibration Isolation System for Inertial Reference and Precision Measurement, Sep. 1661, Rev. Sci. Instrum, vol. 62, No. 9, pp. 2069-2075.

*Primary Examiner* — Melody Burch

(57) ABSTRACT

Actuator arrangement with an actuator (8), a reference mass (22), a spring (24) and a first sensor (26; 42, 43; 32, 36). The actuator (8) applies a force between a first object (2) and to a second object (16; 54). The reference mass (22) is, in use, supported by a third object (16; 56) by means of the spring (24). The first sensor (26; 42, 43; 32, 36) generates a first distance signal that depends on a first distance ($z2$; $z5$, $z6$; $z3$, $z4$) between the reference mass (22) and the first object (2) and is applied to a controller (6) to actuate the actuator (8).

6 Claims, 8 Drawing Sheets

U.S. PATENT DOCUMENTS

| | | | |
|---|---|---|---|
| 5,337,864 A * | 8/1994 | Sjostrom | 188/378 |
| 5,730,429 A * | 3/1998 | Ivers et al. | 267/140.14 |
| 5,785,016 A * | 7/1998 | Enderle et al. | 123/90.11 |
| 5,823,307 A | 10/1998 | Schubert et al. | |
| 6,788,386 B2 * | 9/2004 | Cox et al. | 355/53 |
| 7,084,956 B2 | 8/2006 | Dams et al. | |
| 2002/0143441 A1 * | 10/2002 | Yamaguchi et al. | 701/22 |
| 2002/0185827 A1 * | 12/2002 | Caponetto et al. | 280/5.5 |
| 2003/0052548 A1 | 3/2003 | Hol et al. | |
| 2008/0104914 A1 * | 5/2008 | Lemieux | 52/403.1 |

FOREIGN PATENT DOCUMENTS

| | | |
|---|---|---|
| JP | 08219230 A | 8/1996 |
| JP | 08219230A A | 8/1996 |
| JP | 2000065128 A | 3/2000 |
| WO | WO-02055299 A1 * | 7/2002 |

* cited by examiner

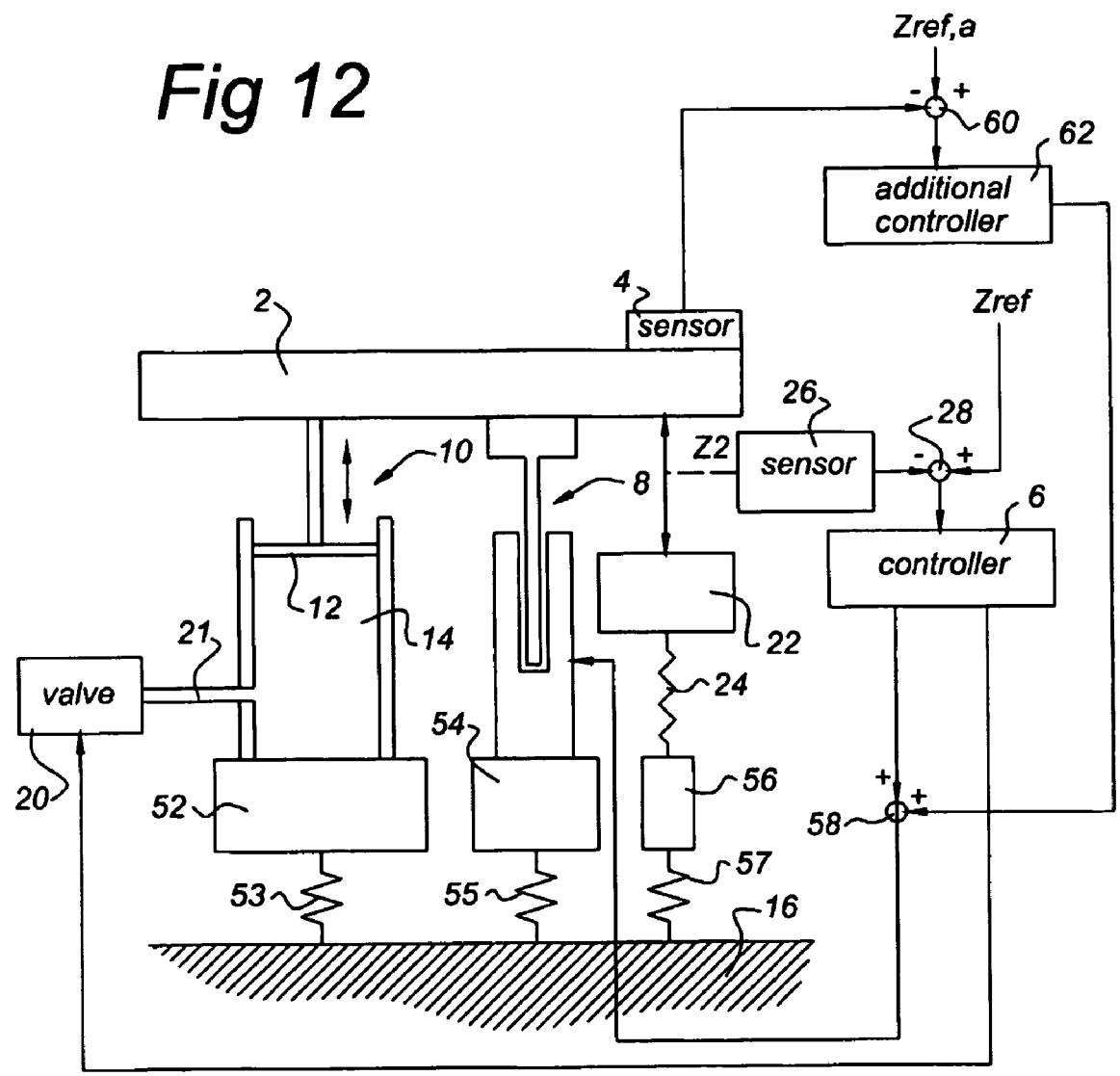

… (1)

ACTUATOR ARRANGEMENT FOR ACTIVE VIBRATION ISOLATION COMPRISING AN INERTIAL REFERENCE MASS

The present invention relates to an actuator arrangement for active vibration isolation comprising an inertial reference mass.

FIG. 1 shows an active vibration isolation system according to the prior art. The system comprises a payload 2, which, e.g., may be a metroframe in a lithography machine. A velocity sensor 4 is attached to the payload 2. Instead of a velocity sensor, an acceleration sensor may be used. The sensor 4 may be a geophone.

The sensor 4 is connected to a controller 6, sometimes referred to as "sky hook" controller. The controller 6 may be any suitable programmed (micro)computer.

However, analog and digital circuits may be used where appropriate.

An actuator 8 is provided between the payload 2 and "earth" 16. The controller 6 is connected to the actuator 8 to provide the actuator 8 with suitable control signals. It is observed that the connections between the sensor 4, the controller 6 and the actuator 8 are shown as physical lines. However, as known to a person skilled in the art, these connections may be wireless connections. This observation also holds for other connections shown in other embodiments of the present invention.

The actuator 8 is shown in a schematic way. The actuator 8 may be a Lorenz motor or any other suitable actuator arranged to generate forces as controlled by controller 6.

FIG. 1 also shows an airmount 10 comprising a piston 12 and a housing 14 in which the piston 12 can move up and down. In use, the housing 14 is filled with air (or any other suitable gas). A valve 20 is provided that is connected to the housing 14 by means of a channel 21. A controller is connected to the valve 20 to control its operation. A sensor 18 is provided to measure the distance z1 between the housing 14 of the airmount 10 and the payload 2. The sensor 18 is connected to a comparator 17 that also receives a reference signal z1 ref. The sensor 18 generates an output signal indicative of the distance z1. The comparator 17 generates an output signal that is proportional to the difference between z1 ref and the output of sensor 18 and applies this to the controller 19. The controller 19 actuates the valve 20 in such a way that the distance z1 is controlled at the desired level z1 ref.

The controllers 6 and 19 need not be separate physical units. They may be implemented as separate programs running on the same computer.

In practice, the payload 2 may be very heavy, e.g., 3000 kilograms or more. It is not strictly necessary that the airmount 10 is provided as an actively controlled arrangement. It may, alternatively, be a passive vibration isolation arrangement. Instead of an airmount 10, other vibration isolation arrangements, like a spring, may be used.

In practical situations, as will be evident to a person skilled in the art that there will mostly be three or four airmounts 10 to support the payload 2. Moreover, FIG. 1 shows one actuator arrangement, including the sensor 4, the controller 6 and the actuator 8, however, in practice there may be multiple actuator arrangements. The actuator arrangements are then arranged to provide vibration isolation in any of six degrees of freedom (x, y, z and rotations about x, y and z), or combinations of the different degrees of freedom.

FIG. 2a shows the transmissibility of a prior art system as shown in FIG. 1. To clarify FIG. 2a, reference is made to FIG. 2c which shows the payload 2 supported by an active vibration isolation AVI standing on earth 16. The active vibration isolation AVI comprises both the airmount 10 and the active actuator 8, as well as the sensors and controllers shown in FIG. 1. The payload 2 may move up and down with an amplitude z, whereas earth 16 may move up and down with an amplitude h. Now, the transmissibility is defined as the ratio z/h, i.e., as the dependence of z on h as a function of frequency.

The curve A is an example of this dependence. Curve A shows isolation above 2 Hz. Below 2 Hz, the payload 2 will simply follow any vibration of earth 16: the isolation system has a 2 Hz eigenfrequency. As is evident to persons skilled in the art, the eigenfrequency is well dampened.

Now, assume that the active vibration isolation AVI is designed to have an eigenfrequency of 0.5 Hz. Then, as can easily be shown, for a vibration with an equal frequency above 2 Hz, the ratio z/h may be roughly sixteen times smaller than in the first case. This better performance is shown by curve B in FIG. 2a.

However, this also has a disadvantage as will be shown with reference to FIG. 2b. FIG. 2b shows the compliance of the system as summarized in FIG. 2c. The compliance is defined as the ratio z/F, where F equals a force directly acting on the payload (for instance, due to a reaction force of a moving object on the payload 2). As is known to a person skilled in the art, when one designs the active vibration isolation AVI with a lower eigenfrequency, this results in a poorer compliance. For instance, FIG. 2b, curve D, shows the compliance z/F for an active vibration isolation with an eigenfrequency of 2 Hz. However, if the active vibration isolation AVI is designed to have an eigenfrequency of 0.5 Hz, this curve D shifts to curve C. One can show that for frequencies below this eigenfrequency of 0.5 Hz the compliance z/F will be roughly sixteen times higher than in the earlier case where the eigenfrequency was 2 Hz.

So, FIGS. 2a and 2b show that there is a coupling between the transmissibility and the compliance in the prior art system according to FIG. 1. If one wants to improve the transmissibility by lowering the suspension frequency, this will be at the cost of the compliance and vice versa.

It is observed that P. G. Nelson, "An active vibration isolation system for inertial reference and precision measurement", *Rev. Sci. Instrum.* 62, (9), September 1991, pages 2069-2075, discloses an active low-frequency vibration isolation system. Nelson describes a seismometer, comprising a payload to be stabilized and to be isolated from vibrations from earth. The payload is suspended from "earth" by means of a first spring. Parallel to the first spring, there is an actuator to damp vibrations.

An additional reference mass suspends from the payload by means of a second spring. A sensor is provided to measure the distance between the payload and the additional reference mass. The actuator between the payload and "earth" is controlled by means of the output signal of this sensor. This document does not disclose a reference mass that is supported by earth and that is used as a reference to be followed by the payload.

The object of the present invention is to provide an active vibration isolation arrangement allowing to improve the compliance substantially while at the same time allowing an equal or improved transmissibility.

To that end, the present invention provides an actuator arrangement comprising an actuator, a reference mass, a first suspension with at least a predetermined spring characteristic in at least one degree of freedom, and a first sensor, the actuator being arranged to apply a force between a first object and a second object, the reference mass being arranged to be supported by a third object by means of the first suspension, and the first sensor being arranged to generate a first distance signal that depends on a first distance between the reference mass and the first object and to apply the first distance signal to a controller to actuate the actuator.

In this way, the present invention provides an active vibration isolation system in which the first object (e.g., a payload) follows the additional reference mass. The additional reference mass is isolated from the second object (e.g. earth) by means of a suspension. As will be explained in detail hereinafter, this provides the possibility of an independent transmissibility and compliance (within the frequency range where the active vibration control operates). Whereas in prior art systems, the transmissibility and compliance are coupled parameters, they are independent in the setup of the invention. In the prior art, when improving one of these two parameters by changing the eigenfrequency of the isolation system, this improvement is at the cost of the other parameter, whereas in the invention both, or only one, may be improved. The additional reference mass and its suspension can be optimally designed with respect to its intended function, that is to behave like a mass-spring system or mass-damper-spring system, whose response only depends on its design and the excitation by the second object and where all other parasitic disturbances are avoided as much as possible.

In one embodiment the actuator arrangement comprises a second sensor for measuring a second distance between the first object and the second object, a first filter connected to the first sensor to generate a first filtered output signal, and a second filter connected to the second sensor to generate a second filtered output signal, the first and second filtered output signals to be applied to the controller.

The actuator arrangement according to the invention may comprise a housing that is arranged to protect the reference mass and the suspension supporting the reference mass.

In a further embodiment, the actuator arrangement comprises a further sensor and a filter, the further sensor being arranged to measure a further distance between the reference mass and the second object and to generate a further output signal for the filter that is arranged to provide a filtered output signal, the filtered output signal to be applied to the controller to allow for compensation of transfer of vibrations of the second object to the first object.

The suspension may be implemented in any suitable way as known to a person skilled in the art. One example is that the suspension is implemented by means of a second actuator, a still further sensor for measuring a still further distance between the additional reference mass and the second object, a further controller arranged to receive a still further output signal from the still further sensor and to actuate the second actuator. In this setup, the suspension can be actively controlled to have a spring constant as desired depending on design choices, e.g., periods of time in which the spring needs to be active.

The invention also relates to an active vibration isolation arrangement comprising at least one actuator arrangement as defined above, and comprising the controller to actuate at least the actuator.

Below, the invention will be illustrated in detail with reference to some drawings.

These drawings are only intended to clarify the present invention and show some embodiments only. They are not intended to limit the invention in any way. The present invention is only limited by the annexed claims and its technical equivalences.

FIGS. 6 through 12 show different embodiments of the active vibration isolation system according to the invention.

It is observed that throughout the figures the same reference numbers refer to the same elements or components.

FIG. 3 shows a first embodiment of the present invention.

Figure 1:
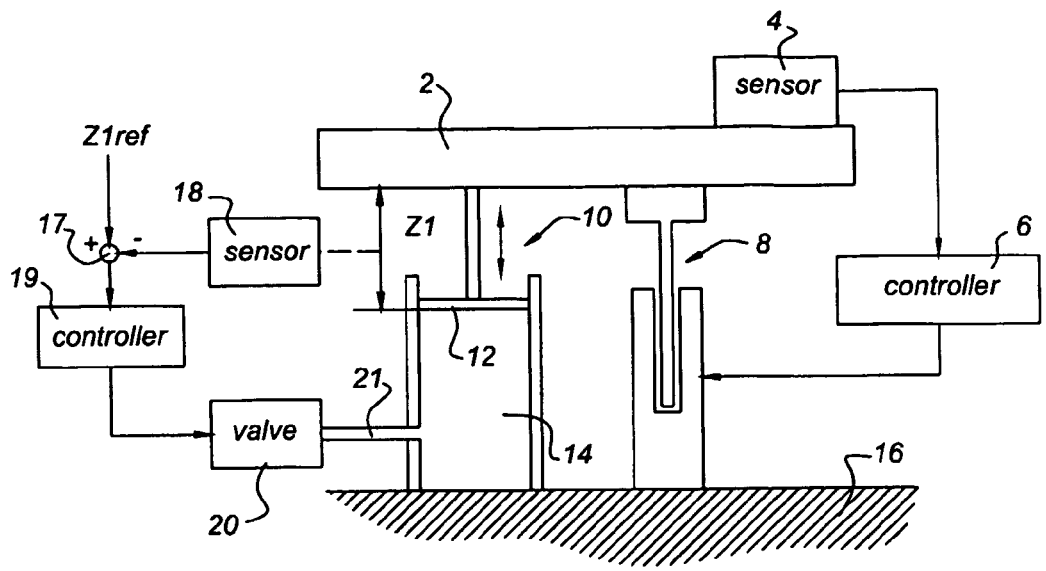
FIG. 1 shows an active vibration isolation system according to the prior art.
Figure 3:
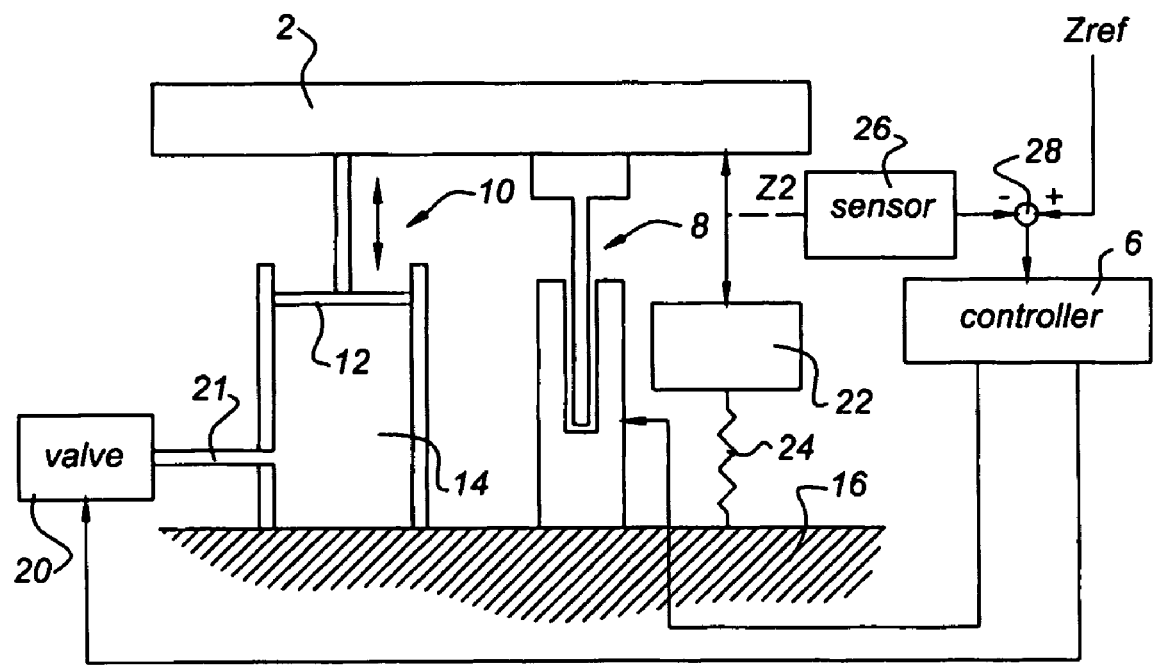
FIG. 3 is an active vibration isolation system in accordance with one embodiment of the present invention.

In the arrangement according to FIG. 3, the sensors 4, 18 as present in the arrangement of FIG. 1 have been removed.

An additional reference mass 22 is provided supported on earth 16 by a suspension 24. The suspension 24 may be a spring with a spring constant. However, alternatively, it may be a combination of a spring and a damper (e.g. a sky hook damper) and have a predetermined spring and damping characteristic. Below, for the sake of simplicity, it will mostly be referred to as spring 24.

In reality, there may be more such suspensions in different degrees of freedom. Then, the mass 22 may be used as a reference mass in multiple degrees of freedom.

A sensor 26 is provided to measure the distance z2 between the additional reference mass 22 and the payload 2. The sensor 26 sends an output signal to a comparator 28. The comparator 28 also receives a reference signal zref and subtracts the output signal received from the sensor 26 from zref. An output signal based on this comparison is applied by the comparator 28 to the controller 6. The controller 6 is connected to the actuator 8 and may also be connected to the valve 20.

As will be evident to persons skilled in the art, the additional reference mass 22 does not need to be supported by the spring 24 on earth 16 itself. The additional reference mass 22 may, alternatively, be supported by means of spring 24 on, e.g., a baseframe standing on earth 16.

The general idea of the setup of FIG. 3 is that the additional reference mass 22 together with its support can be optimally designed with respect to its intended function, that is to behave like a mass-spring system or mass-damper-spring system, whose response only depends on its design and the excitation by the second object 16 and where all other, parasitic disturbances such as friction or crosstalk are avoided as much as possible.

By designing controller 6 such that the payload 2 follows the position of additional reference mass 22, the combination of transmissibility and compliance can be improved dramatically as will be shown with reference to FIGS. 4a, 4b, 5a and 5b.

Figure 2A:
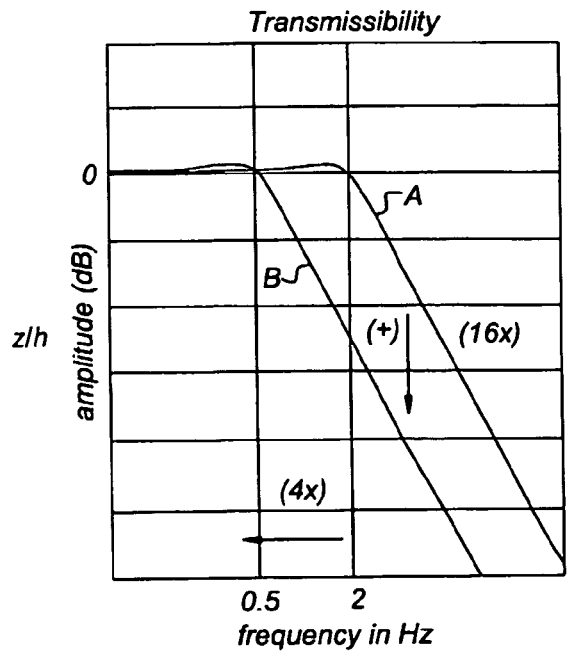
FIG. 2a show curves related to transmissibility of the system according to FIG. 1.
Figure 2B:
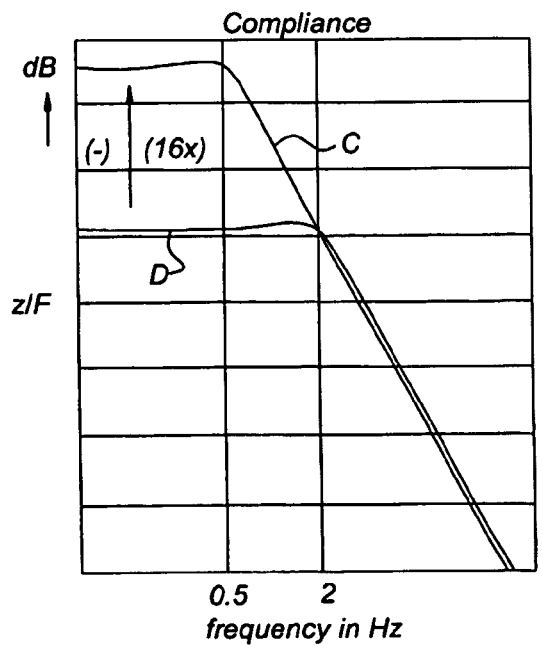
FIG. 2b shows curves related to compliance of the system according to FIG. 1.
Figure 2C:
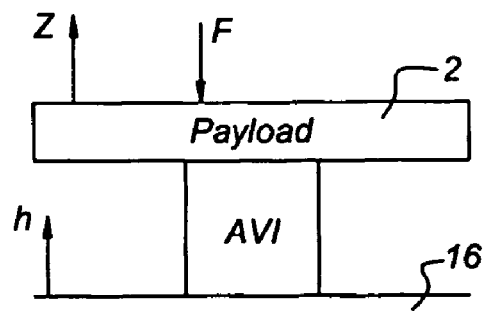
FIG. 2c is a very schematic summary of the system according to FIG. 1 used to explain FIGS. 2a and 2b.
Figure 4A:
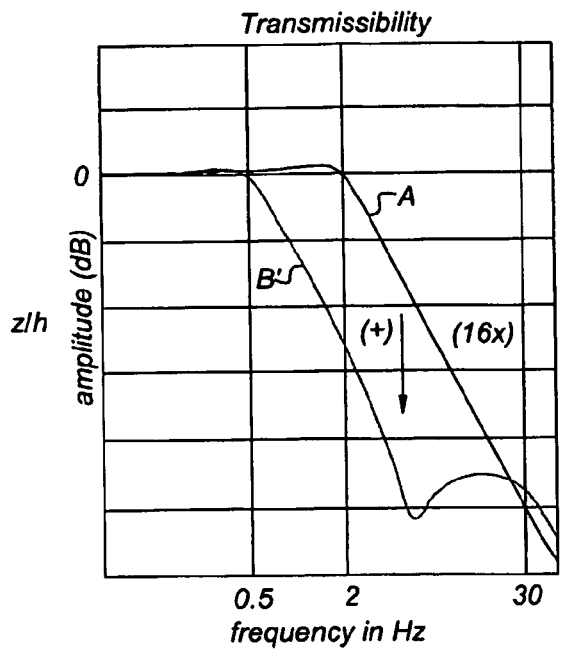
FIG. 4a shows curves relating to transmissibility of the system shown in FIG. 3 and FIG. 1.

FIG. 4a shows curves A and B' which are comparable with the curves A and B of FIG. 2a. Curve A shows the transmissibility of the system of FIG. 1 for an eigenfrequency of 2 Hz. In this case the airmount 10 is said to be a 2 Hz airmount. Curve B' shows the transmissibility for an actuator arrangement of FIG. 3 with a reference mass eigenfrequency of 0.5 Hz and the airmount 10 also being a 2 Hz airmount. At the lower right hand side of FIG. 4a, curve B' increases but this is determined by the chosen bandwidth of the control loop.

Figure 4B:
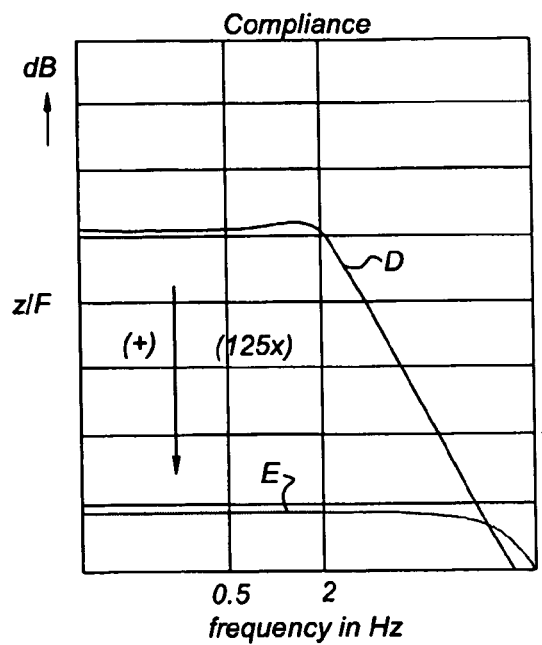
FIG. 4b shows curves related to compliance of the system according to FIG. 3 and FIG. 1.

FIG. 4b shows compliance curves. Curve D, again, shows the compliance for the arrangement of FIG. 1 having an eigenfrequency of 2 Hz. Curve E shows the compliance for the actuator arrangement of FIG. 3. Curve E shows that the compliance has dramatically improved, i.e., it may be roughly 125 times or more better than curve D up to a frequency that will be determined by the control loop.

Figure 5A:
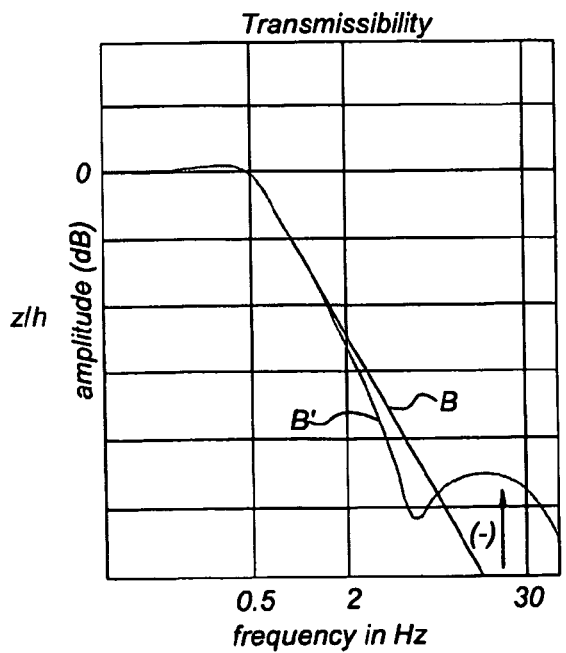
FIGS. 5a and 5b are similar to FIGS. 4a and 4b, however related to a specific arrangement of the system according to FIG. 1.

In FIG. 5a, curve B shows the transmissibility of the system as shown in FIG. 1 for an eigenfrequency of 0.5 Hz, the airmount being a 0.5 Hz airmount. In FIG. 5a, curve B' is identical to curve B' already shown in FIG. 4a, i.e., it relates to the transmissibility of the actuator arrangement shown in FIG. 3 with a reference mass eigenfrequency of 0.5 Hz and a 2 Hz airmount 10. Thus, FIG. 5a shows that, due to the choice of airmount in combination with the limited bandwidth, the transmissibility of the arrangement according to FIG. 3 may be worse than in the known arrangement of FIG. 1 for higher frequencies.

Figure 5B:
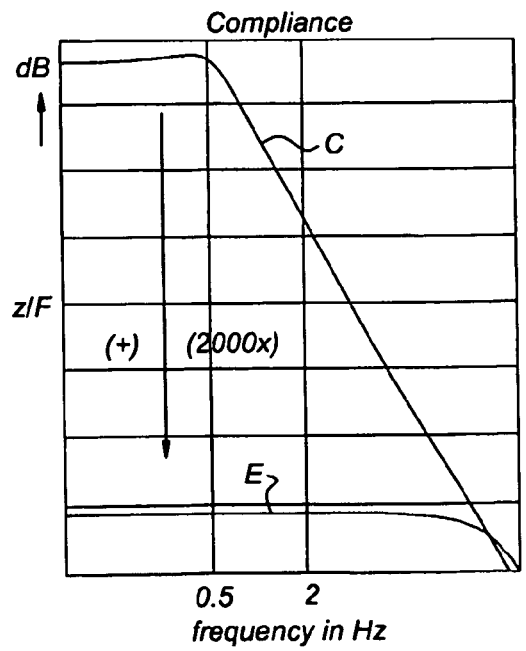

FIG. 5b shows the compliance of the known arrangement of FIG. 1 for an eigenfrequency of 0.5 Hz via curve C. FIG. 5b also shows curve E already presented in FIG. 4b and which relate to the arrangement of FIG. 3. Now, one can see that for a prior art system with a lower eigenfrequency of 0.5 Hz, the comparison with the system of FIG. 3 is even more dramatic than for a prior art system with an eigenfrequency of 2 Hz. I.e., FIG. 5b shows that the improvement may be more than 2000 times.

Thus, FIGS. 4a, 4b, 5a and 5b show that with the setup of the invention, both the transmissibility and the compliance may be improved. The transmissibility and compliance are no longer coupled as is the case with the prior art. One can either choose to improve both or only one of them without deteriorating the other one. This improvement is possible because the payload 2 now has to follow an independent reference mass like the additional reference mass 22.

It is observed, that in the arrangement according to FIG. 3, the controller 6 does not need to control valve 20. The airmount 10 can be substituted by a passive isolation system like a (large) spring. A further alternative may be, that there is no airmount 10 or equivalent spring at all. The actuator arrangement comprising the actuator 8, the additional reference mass 22, the spring 24 and sensor 26 may be provided as a separate unit to be applied in any active vibration isolation system. When applied in a system as shown in FIG. 3 (or other embodiments still to follow), the additional reference mass 22 may be designed with a low eigenfrequency of, e.g., 0.5 Hz. If so, then, the airmount 10 supporting the payload 2 may be designed with an eigenfrequency that is higher, e.g., 2 Hz and may even be passive, while up to a certain frequency, the payload behaves—with respect to the transmissibility—as if it were a system with a 0.5 Hz airmount. Such an airmount 10 is cheaper than an airmount 10 with an eigenfrequency of 0.5 Hz.

When applied in a system as shown in FIG. 3, with the reference mass having a 0.5 Hz eigenfrequency, the airmount 10 may also be designed with a 0.5 Hz eigenfrequency. In this situation, the transmissibility does not change by switching the actuator arrangement on or off, while the compliance improves dramatically.

It is observed that the spring 24 may itself be implemented as an active vibration isolation arrangement. For instance, the mass 22 together with the spring 24 may be designed as the system shown in FIG. 1. Then, the additional reference mass 22 equals the payload 2, whereas the spring 24 is arranged to include sensors 4, 18, valve 20, channel 21, airmount 10 (or another spring, possibly passive), actuator 8 and controller 6. Of course, these elements need to be scaled to the desired level then.

Figure 6:
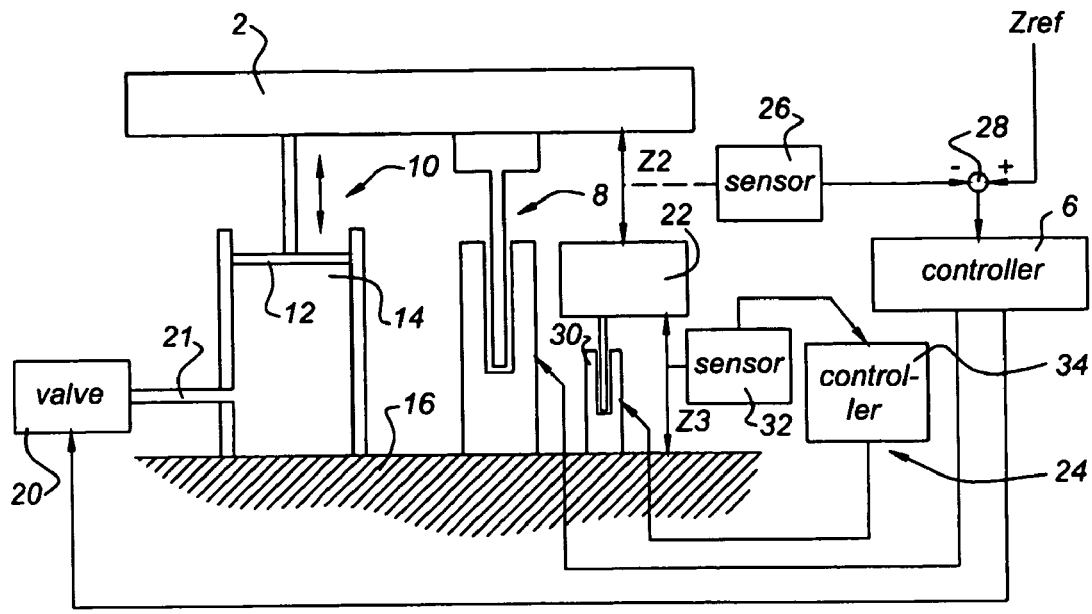

FIG. 6 shows a further embodiment of the present invention. In FIG. 6, the spring 24 is implemented by means of an actuator 30, a sensor 32 and a controller 34. The sensor 32 is arranged to measure the distance z3 between the mass 22 and the earth 16. The sensor 32 outputs an output signal to the controller 34. The controller 34 is arranged to actuate the actuator 30. The actuator 30 may be any suitable actuator, e.g., a Lorenz actuator.

The setup of the actuator 30, the sensor 32 and the controller 34 is arranged such that it behaves as a suspension with a predetermined spring constant, or with spring and damping constant. E.g., together with the additional reference mass 22, the "mass-spring" system of FIG. 6 (comprising the mass 22 and the spring 24) may be designed to have an eigenfrequency of 0.5 Hz. This can easily be done with an active spring 24 as shown. Note that such a low eigenfrequency of 0.5 Hz would be very difficult with a physical spring, taking into account that all parasitic effects must be prevented or minimized. E.g. a mechanical spring would easily introduce parasitic forces caused by the internal resonances in the spring itself.

Moreover, the output signal of the sensor 32 may be compared with a reference height such that the controller 34 controls the actuator 30 to keep the mass 22 at a desired offset height for z3. Such a reference height provides the arrangement with the option to control the distance z3 in dependence on client requirements. This distance z3 may have a desired value that depends on the desired offset distance between the payload 2 and the second object 16.

Moreover, the arrangement of FIG. 6 provides the option of changing the eigenfrequency of the additional reference mass 22 and the spring 24 during measurements. For instance, it may be that one wishes to have an eigenfrequency of, say, 10 Hz during a certain period of time and an eigenfrequency of 0.5 Hz during a later period of time.

Moreover, the setup of FIG. 6 can be designed such that it has (almost) no hysteresis at all.

It is observed, that spring 24 may also be realized, using a spring with a negative spring constant k as part of the spring 24. This is known to a person skilled in the art and need no further elaboration here. Reference may be made e.g. to website www.minusk.com.

Figure 7:
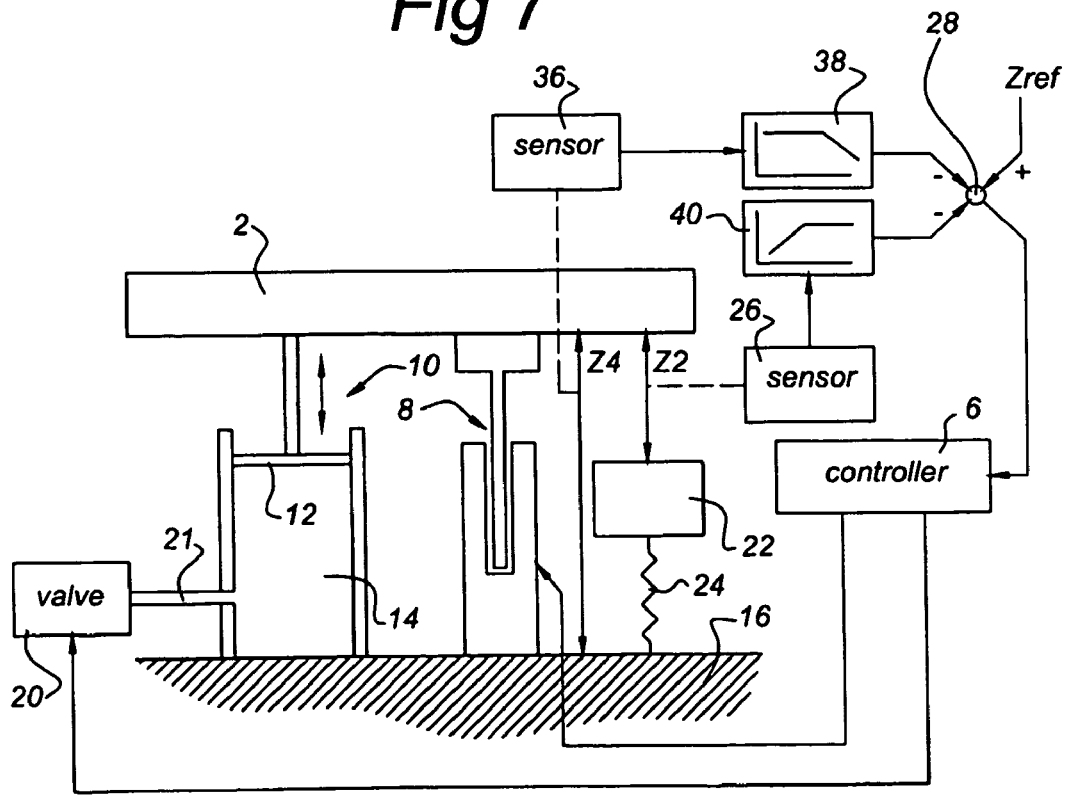

FIG. 7 shows a further embodiment of the present invention.

The arrangement of FIG. 7 comprises, apart from the components/elements already described with reference to earlier figures, a sensor 36 for measuring the distance z4 between the payload 2 and earth 16. The sensor 36 is connected to a low pass filter 38. The low pass filter 38 is connected to comparator 28.

The sensor 26 that measures the distance z2 between the additional reference mass 22 and the payload 2 is not, as in earlier figures, directly connected to comparator 28 but to a high pass filter 40. The high pass filter 40 is, in turn, connected to the comparator 28.

Because of the low pass filter 38, the output signal of the sensor 36 is dominant for low frequencies, as determined by the filter design. Moreover, the output signal of sensor 26 will mainly influence the feedback as shown for frequencies above the cut-off frequency of the high pass filter 40. Preferably, the cut-off frequencies of the filters 38, 40 are related to the eigenfrequency of the additional reference mass 22 with spring 24. Thus, in the arrangement shown in FIG. 7, the payload 2 will mainly follow movements of earth 16 in the low frequency range, whereas the payload 2 will mainly follow movements of the additional reference mass 22 in the higher frequency range. This setup provides a solution for the situation where the reference mass is poorly damped.

Note that the spring 24 can be designed in any way as explained earlier. Also note that the cut-off frequencies of filters 38, 40 can be different. Also note that the filters 38, 40 can be extended with (multiple) general second-order filters to compensate for specific dynamic effects. Filter 40 may, e.g., be designed such that the influence of sensor 26 is minimized in a predetermined frequency range, i.e., filter 40 may be a notch filter. Then, filter 38 may be designed as a bandpass filter such that sensor 36 has a large influence in that same frequency range.

Figure 8:
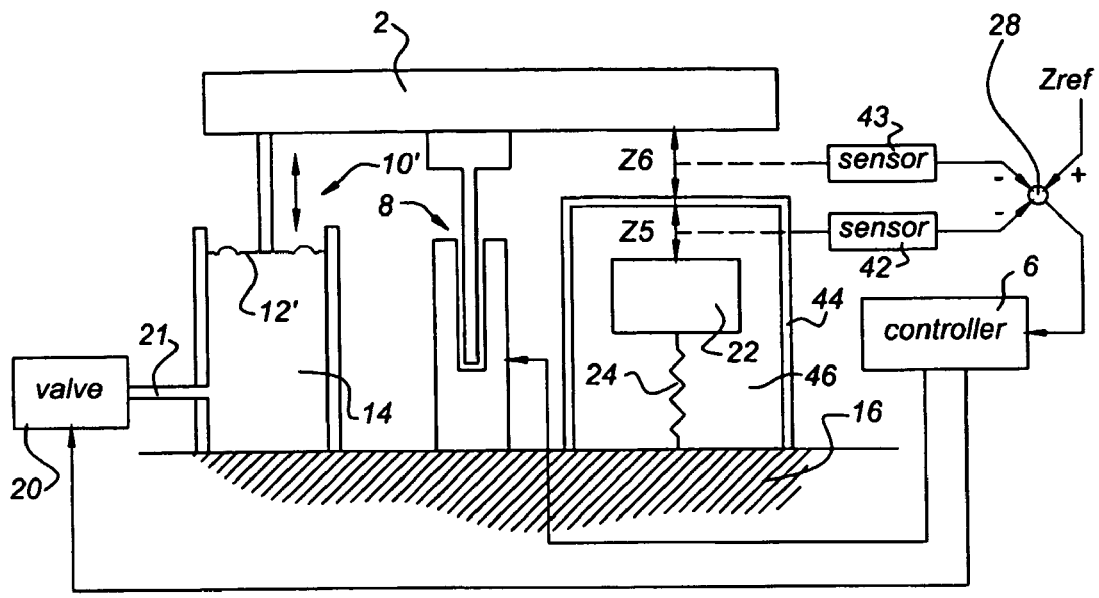

FIG. 8 shows a further embodiment of the present invention.

In the arrangement according to FIG. 8, a housing 44 is provided around the additional reference mass 22 and the spring 24. The housing 44 is intended to protect the additional reference mass 22 and the spring 24 from external disturbances that may cause the additional reference mass 22 to vibrate. An example of such an external disturbance is an acoustic signal.

In the arrangement of FIG. 8, a sensor 42 is provided to measure the distance z5 between the additional reference mass 22 and an upper surface of the housing 44. A further sensor 43 is provided to measure the distance z6 between the upper surface of the housing 44 and the payload 2. The sensor 42 sends an output signal to the comparator 28. The sensor 43 sends an output signal to the comparator 28 too. As one can easily see, the sum of distances z4 and z5 has a linear relationship with the distance z2 of the earlier embodiments. Thus, the arrangement of FIG. 8, as regards the feedback system, is equivalent to the arrangements of FIGS. 3, 6 and 7.

The housing 44 encloses a space 46. In one embodiment, the space 46 may be vacuum, i.e. have a pressure below $10^5$ Pa, to further reduce any influence of acoustic signals.

FIG. 8 also shows an alternative embodiment of airmount 10. The alternative airmount 10' does not comprise a piston 12 that can be shifted freely in the housing 14 of the airmount 10', but comprises a piston 12' that is fixed to the housing 14 by means of a bellows construction, or a membrane construction.

As in the earlier embodiments, the airmount 10' need not be an actively controlled airmount. Alternatively, it may be a passive airmount (or any other active or passive spring arrangement) or a gravity compensator. Apart from the better possibility to protect the additional reference mass 22 and the spring 24 from external disturbances, the arrangement of FIG. 8 provides more options as to measuring the distances z5 and z6.

Figure 9:
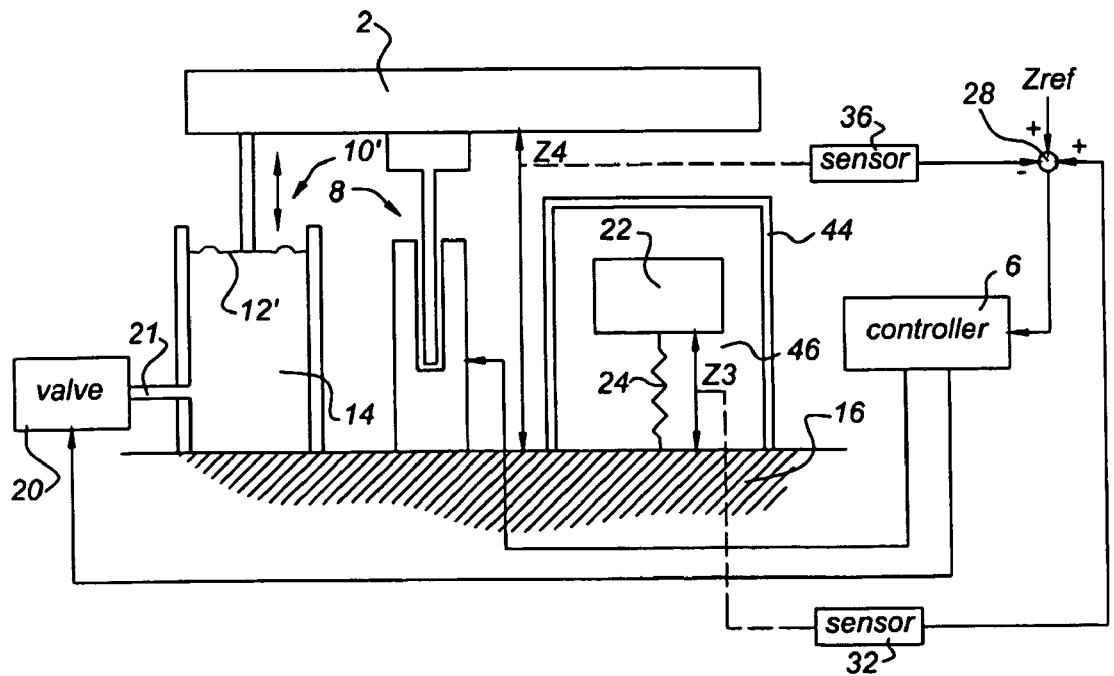

FIG. 9 shows a further embodiment of the present invention.

The arrangement of FIG. 9 is similar to the arrangement of FIG. 8. The difference is that sensors 42, 43 are substituted by sensors 36 and 32. The sensor 36 measures the distance z4 between the payload 2 and the earth 16 (as in FIG. 7). The output signal of the sensor 36 is directly applied to the comparator 28. The sensor 32 measures the distance z3 between the additional reference mass 22 and earth 16 (as in FIG. 6) and sends an output signal corresponding to this distance z3 to the comparator 28. The comparator 28 adds the output signal of the sensor 32 to the reference signal zref and subtracts the output signal of the sensor 36. In this way, the comparator 28 applies an output signal to the controller 6 that is an indication of z4−z3, that is proportional to distance z2 of the arrangement in accordance with FIGS. 3, 6 and 7.

It is observed that sensors 43 and 36 are technically equivalent: since the housing 44 is a fixed stiff body, their output signals differ only by a predetermined constant. Sensors 42 and 32 differ also by a constant, and moreover by a minus-sign.

Figure 10:
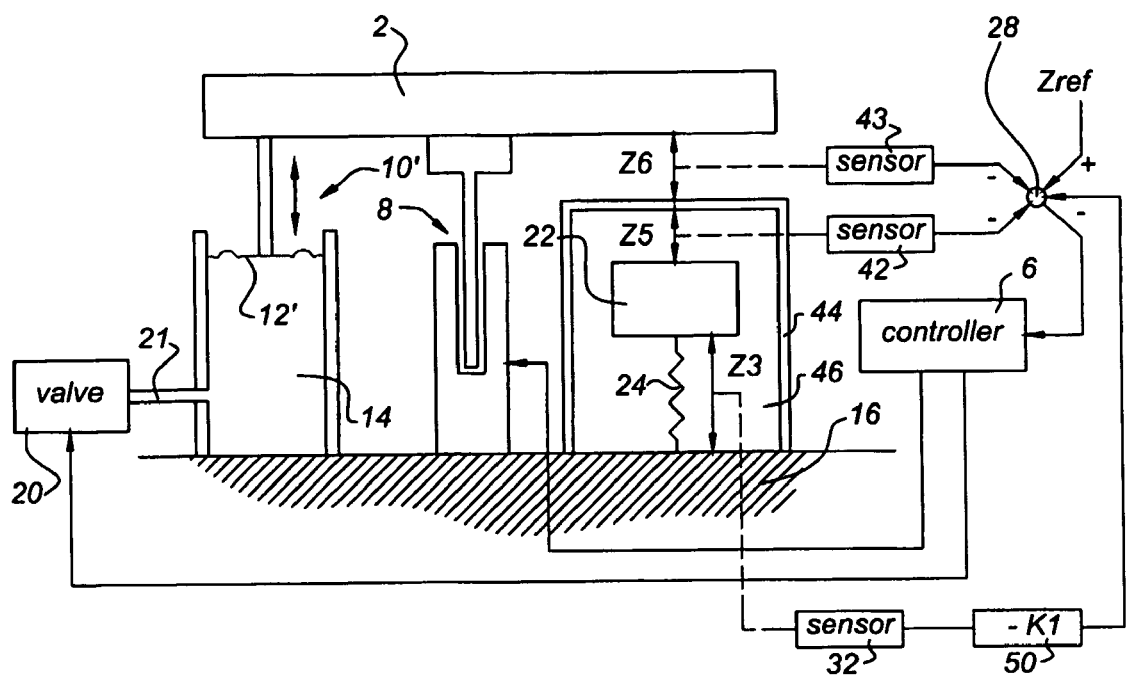

FIG. 10 shows a further embodiment of the present invention.

The arrangement of FIG. 10 comprises the sensors 32, 42, and 43, respectively, for measuring the distances z3, z5, and z6, respectively, as explained with reference to FIGS. 6, 8. The output signal of the sensor 32 is sent to a multiplier 50 that multiplies the output signal of sensor 32 by a factor −k1. The output signal of the multiplier 50 is applied to the comparator 28. Thus, the comparator 28 sends an output signal to controller 6 that is proportional to z5+z6−k1.z3. In this embodiment, the signal −k1.z3 is used as a feed forward signal to compensate for vibrations of earth 16 that may reach the payload 2 via all kinds of mechanical structures between the payload 2 and earth 16 (e.g., cables, cooling water, the airmount, etc.). This compensation signal can also be used in other embodiments.

Note that, again, z3 and z5 only differ by a fixed constant and a minus-sign. Thus, the arrangement of FIG. 10 can be simplified by using either sensor 32 or 42 alone and filtering its output signal in a way such that the same effect is obtained.

Moreover, it is observed that multiplier 50 may in general be a filter that does more than multiplying by −k1. It may e.g. be a low-pass filter.

Figure 11:
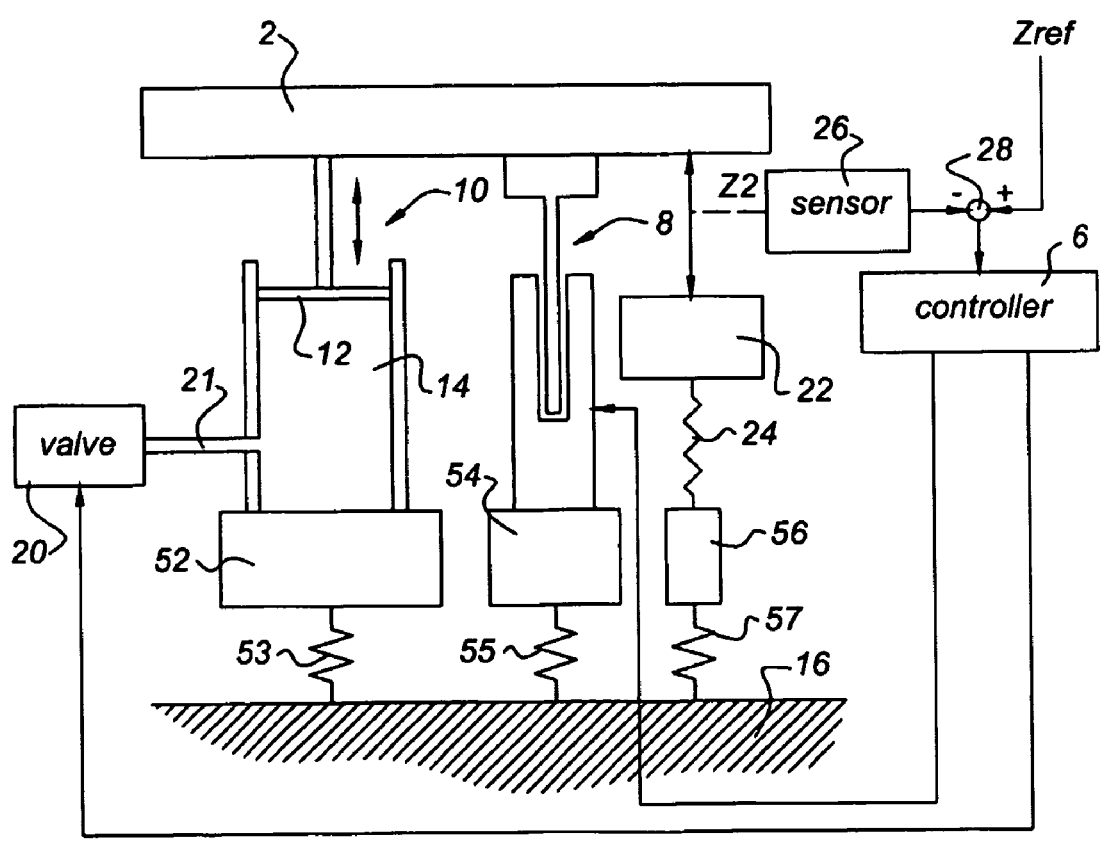

FIG. 11 shows a further embodiment of the invention.

The embodiment of FIG. 11 resembles the one of FIG. 3. The differences are as follows.

First of all, the reference mass 22 is not directly supported by earth 16. Instead, reference mass 22 is supported by a first subframe 56 via spring 24. The first subframe 56 is supported by earth 16 via a spring 57.

Secondly, the actuator 8 is not directly supported by earth 16. Instead, actuator 8 is supported by a second subframe 54. The second subframe 54 is supported by earth 16 via a spring 55.

Thirdly, the airmount 10 is not directly supported by earth 16. Instead, airmount 10 is supported by a third subframe 52. The third subframe 52 is supported by earth 16 via a spring 53.

The first, second and third subframes 52, 54, 56 are not connected to one another.

As to the actuator 8, the setup of FIG. 11 has the following advantages. The sensor 26 measures the displacement of the payload 2 relative to the reference mass 22. Based on the output signal of the sensor 26, the controller 6 generates a control signal for actuator 8 such that the actuator 8 produces a controlled force to payload 2, as explained above. By doing so the position of the payload 2 relative to the reference mass 22 is controlled. Assuming in the setup of FIG. 3 that earth 16 has a finite mass, then earth 16 may be displaced by the force produced by the actuator 8. This latter displacement may, in the setup of FIG. 3, cause the reference mass 22 to move by a force transfer via spring 24. Consequences may be:

due to the undesired movement of reference mass 22, the performance of the control system deteriorates: the object is to have a reference mass 22 that is as stable as possible as to its position;

due to transfer of the force produced by the actuator 8, the control loop may become unstable. By the displacement of reference mass 22, the value of Z2 as measured by sensor 26 changes resulting in a further change of the force produced by actuator 8. To prevent instability of the control loop to occur, in the setup of FIG. 3, the bandwidth of the control loop has to be reduced, however, which results in poorer performance.

By adding subframe 54 supporting the actuator 8 and itself being supported by earth via spring 55, any force generated by actuator 8 is not directly transferred to earth 16 but filtered. This results in less displacement of earth 16 and thus less displacement of reference mass 22 than in the setup of FIG. 3. Of course, the amount of filtering and the overall improvement depend on the design choices made as to the mass of first subframe 54 and the spring constant (and damping) of spring 55.

The improvement achieved by adding subframe 54 and spring 55 can be further improved by adding subframe 56 that supports reference mass 22 via spring 24 and is supported itself by earth 16 via spring 57. Then, a further filtering effect of the force transfer between actuator 8 and reference mass 22 occurs. It is not strictly necessary that both subframes 54 and 56 are additionally applied. An improvement over the setup of FIG. 3 may also already be achieved by using subframe 56 without using subframe 54.

Note that, in a practical situation, there may be four such actuators 8 and three sensors 26 with three reference masses 22. These three sensors 26 and three reference masses 22 may be implemented as three sensor units, each sensor unit comprising one sensor 26 and one reference mass 22. These sensor units and actuators 8 may be arranged remote from one another.

Finally, in addition to or as a separate measure to the setup of FIG. 3, the airmount 10 may be supported on the subframe 52, preventing direct force transfer from earth 16 to airmount 10 due to any displacement of earth 16.

FIG. 12 shows a further embodiment of the invention.

In the arrangement of FIG. 12, the setup of FIG. 3 is combined with sky hook arrangement as already explained with reference to FIG. 1. The sensor 4 is shown to produce an output signal for a controller 62. For completeness' sake, the output signal is shown to be applied to a comparator 60, which compares this output signal with a reference signal Zref,a. The comparator 60 produces an output signal for controller 62. The controller 62 produces a control signal in dependence on the signal received from the comparator 60. That control signal is added to the control signal produced by controller 6 in a summing device 58. Thus both control signals of both controllers 6, 62 control the force to be generated by actuator 8. As will be evident to persons skilled in the art, there need not be two separate controllers 6, 62. The required functionality can be provided by one single controller, programmed in a suitable way.

The prior art arrangement of FIG. 1 may be a low-frequency suspension system with a suspension frequency in the range from 0.5-5 Hz. In the arrangement according to FIG. 12, however, due to the control loop via sensor 26 and controller 6, the suspension frequency may be much higher, e.g., in the range between 20-80 Hz. If so, then, in the arrangement of FIG. 12, the sensor 4 has only to be suitable for functioning in a system with a suspension frequency of typically 20-80 Hz. In practice this is an easier task: using sensor 4 in the range from 0.5-5 Hz needs additional measures, like using a stretch filter as known to persons skilled in the art. In the arrangement of FIG. 12, such a filter can be omitted.

As will be evident to persons skilled in the art, the invention is not restricted to the embodiments described above. Several alternatives are possible.

For instance, the arrangements may, in reality, be upside down relative to the arrangements shown. Moreover, the controllers 6, 34 are shown as separate units. In reality they may be implemented as separate programs on the same computer. Sensors measuring the same distance are indicated with the same reference numerals. However, they may be different.

The filters 38, 40 may be part of controller 6. They may be implemented as analogue filters, digital filters or part of a program running on a computer. The comparator 28 need not be a separate unit but may be integrated in controller 6, either as unit or as part of a computer program. The comparator 60 need not be a separate unit but may be integrated in controller 62, either as a unit or as part of a computer program. The multiplier 50 may similarly be an integral part of controller 6. The airmount 10, 10' may be substituted by a gravity compensator. The sensors may be capacitive sensors or interferometers. Amplifiers may be arranged between the controllers and the actuators, as required.

Moreover, different parts of the different embodiments may be combined. For instance, in the embodiment of FIG. 9, the housing 44 may be omitted. Also in FIG. 10, the housing 44 may be omitted. Then, sensors 42, 43 will be substituted by sensor 26.

Moreover, there may be more than one airmount to support the payload 2. The additional reference mass 12 may be suspended in more than one degree of freedom and may then be a good reference for measuring the position of the payload 22 in more than one degree of freedom. Then, there may be more sensors provided to measure distances between the payload 2 and the reference mass 22 to obtain information about distances and rotations in more degrees of freedom. The outputs of these sensors are applied to a multi-input-multi-output processor that controls several actuators (via suitable amplifiers) actuating the payload 2 in the desired degrees of freedom. Instead of one additional reference mass 22 with suspension 24, there may be provided a plurality. All these alternatives/additions are included in the scope of the annexed claims.

The invention claimed is:

1. Actuator arrangement comprising:
    an actuator,
    a reference mass,
    a first suspension with at least a predetermined spring characteristic in at least one degree of freedom, and
    a first sensor,
    a second sensor,
    an airmount,
    a summing device,
    the actuator being arranged to apply a force between a first object and a second object,
    the reference mass being arranged in parallel, to said actuator, and supported by a third object by means of said first suspension,
    the airmount being arranged to support the first object,
    the airmount being supported on said second object by a fourth object by means of a second suspension,
    said reference mass and said first suspension being decoupled via an air gap from, said first object and having a response characteristic independent of said first object, and
    said first sensor being arranged to generate a first distance signal that depends on a first distance between said reference mass and said first object and to provide said first distance signal to a first controller, said first controller producing a first control signal in dependence on the received first distance signal,
    said second sensor being arranged to generate a second distance signal that depends on a displacement of the first object and to provide a second distance signal to a second controller for producing a second control signal in dependence on the received second distance signal,
    said summing device for summing the first and second control signals received from the respective first and second controllers thereby producing a summed control signal for actuating said actuator to enable the first object to substantially follow the position of the reference mass, said third object not being one and the same as said second object, said fourth object not being one and the same as said second and third objects.

2. Actuator arrangement according to claim 1, wherein said actuator is a Lorenz actuator.

3. Actuator arrangement according to claim 1, wherein said third object is supported by said second object by a third suspension.

4. Actuator arrangement according to claim 1, wherein said actuator arrangement comprises a sky hook control arrangement for controlling displacement of said first object.

5. Active vibration isolation arrangement comprising at least one actuator arrangement according to claim 1, and comprising first and second controllers to control at least said actuator.

6. Active vibration isolation arrangement according to claim 1, comprising at least one said airmount to support said first object.

* * * * *